May 7, 1968  C. E. MILLER  3,382,443
METHOD OF AND APPARATUS FOR SIGNAL-FREQUENCY SHIFTING
Filed Sept. 10, 1964  3 Sheets-Sheet 1

INVENTOR
CHARLES E. MILLER
BY Rines and Rines
ATTORNEYS

May 7, 1968  C. E. MILLER  3,382,443
METHOD OF AND APPARATUS FOR SIGNAL-FREQUENCY SHIFTING
Filed Sept. 10, 1964  3 Sheets-Sheet 2

INVENTOR
CHARLES E. MILLER

BY  *Rines and Rines*

ATTORNEYS

May 7, 1968   C. E. MILLER   3,382,443
METHOD OF AND APPARATUS FOR SIGNAL-FREQUENCY SHIFTING
Filed Sept. 10, 1964   3 Sheets-Sheet 3

INVENTOR
CHARLES E. MILLER
BY Rines and Rines
ATTORNEYS

United States Patent Office 3,382,443
Patented May 7, 1968

3,382,443
METHOD OF AND APPARATUS FOR SIGNAL-FREQUENCY SHIFTING
Charles E. Miller, Acton, Mass., assignor to General Radio Company, West Concord, Mass., a corporation of Massachusetts
Filed Sept. 10, 1964, Ser. No. 395,414
36 Claims. (Cl. 328—55)

The present invention relates to methods of and apparatus for signal-frequency shifting and, more particularly, to apparatus for producing from a periodic electrical signal a new periodic electrical signal having a phase and/or frequency correlated to the electrical input signals by a known factor.

While numerous types of signal-frequency shifting circuits have been utilized and proposed over the years for a host of purposes, there still exists a class of problems for which no simple and reliable apparatus has heretofore been evolved for producing from a periodic input signal a different periodic output signal with phase and/or frequency correlated to the input signal by a known factor. It is desirable that such apparatus be capable of operation from a variety of complex waveforms and that the difference between the output and the input frequencies may be made very small. Among such problems, as an illustration, is the producing of stroboscopic light flashes in response to periodic electrical signals corresponding to periodic mechanical motion to be viewed stroboscopically, in a manner such that a constant apparent slip is automatically obtained; that is, for example, the phase of the strobe-producing signals varies slowly and continuously with respect to the input signal. If the input signal has associated with it a given fundamental frequency, and the phase of the output strobe-producing signal varies linearly with respect to the input signal, then the strobe-producing signal will, in accordance with the invention, also vary linearly with respect to time, providing a constant time rate of change of phase of the output signal and thus representative of a new constant output frequency. Though the invention will, for purposes of illustration and clarity be hereinafter described in connection with this important stroboscopic-slip application, it is to be understood that the method and apparatus herein disclosed are equally and more generally useful for the solution of other similar or related problems and may be employed wherever the advantageous features and results attainable therewith may be desired.

An object of the invention, accordingly, is to provide a new and improved method of and apparatus for signal-frequency shifting having the above-described features.

A further object is to provide a novel stroboscopic apparatus.

Still another object is to provide new and improved frequency-changing apparatus of more general utility, also.

Other and further objects will be explained hereinafter and will be more particularly pointed out in the appended claims.

The invention will now be described in connection with the accompanying drawing.

Figure 1:
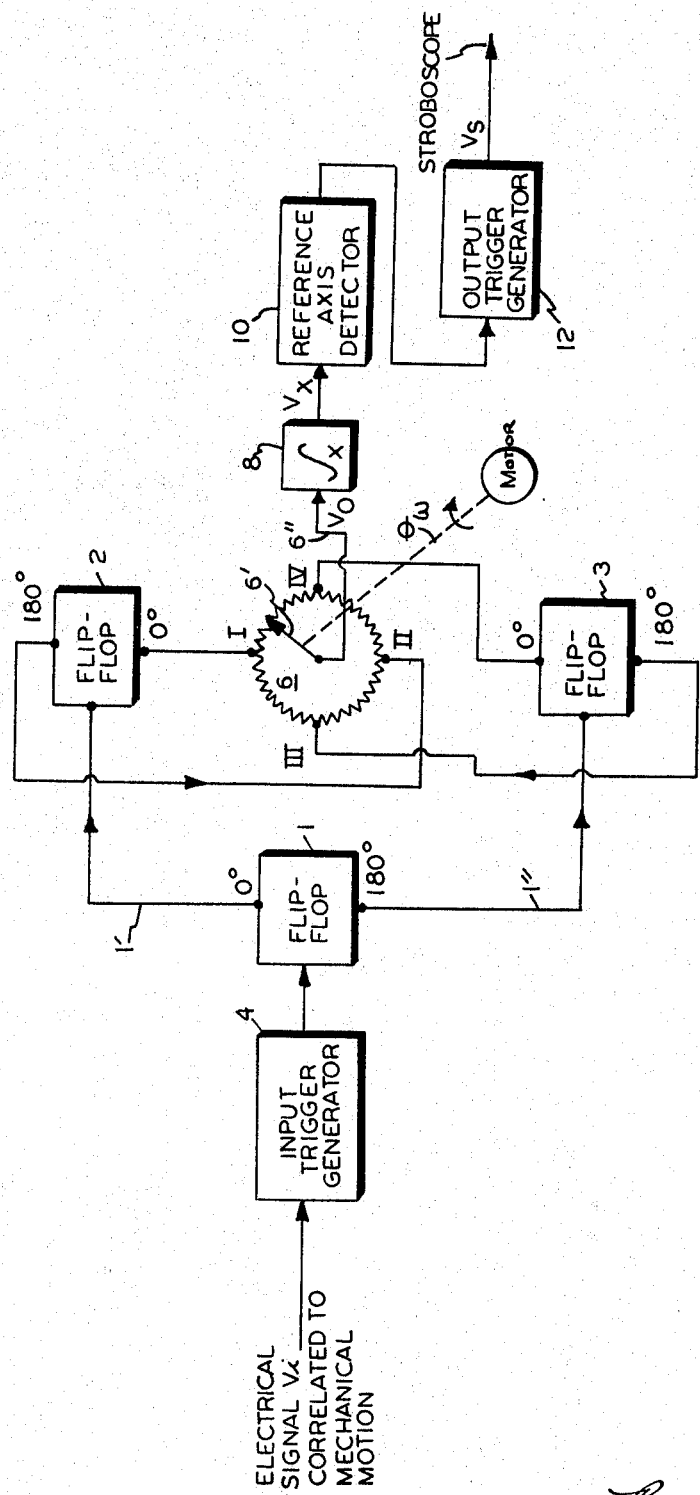
FIG. 1 is a block diagram of an apparatus operated and constructed in accordance with the invention.

Referring to FIG. 1, an input electrical signal $Vi$, correlated to periodic mechanical motion to be stroboscopically viewed, and the phase of which does not vary with respect to the phase of the mechanical motion, is transformed into a series of trigger pulses in a trigger generator 4 for successively switching the state of a first flip-flop stage 1. The flip-flop 1 and the hereinafter-described further flip-flop stages 2 and 3 may be of any conventional type having symmetrical out-of-phase outputs, indicated at 0° and 180°. The outputs at 0° and 180° are illustrated as triggering the respective flip-flops 2 and 3 along paths 1' and 1", as with differentiated output triggering pulses. Unidirectional steps only of flip-flop 1 effect a change in the state of the flip-flop stages 2 and 3. Thus each flip-flop 2 and 3 operates at half the frequency of flip-flop stage 1 with the four rectangular or substantially square-wave signal-component outputs from stages 2 and 3 operating in quadrature. These quadrature phase-displaced input signal components are shown applied to a linear summing device 6, illustrated in the preferred, though not essential, form of a substantially circular potentiometer network having four equal-resistance quadrants energized at terminals I, II, III and IV by the quadrature square waves applied, respectively, from the 0° and 180° outputs of flip-flop 2 and the 180° and 0° outputs of flip-flop stage 3. The position of the wiper 6' may be varied to vary the relative proportions of the summed quadrature-phase-displaced signal components, as by rotation by a motor, so labelled, applying the summation voltage $V_o$ thereat by conductor 6" to an integrator network or circuit 8. Since the resistance of the potentiometer voltage-divider network 6 is linear, the variation of component amplitudes comprising $V_o$ will be a linear function of the angle $\theta$ that the wiper 6' assumes with respect to terminal I.

Figure 2:
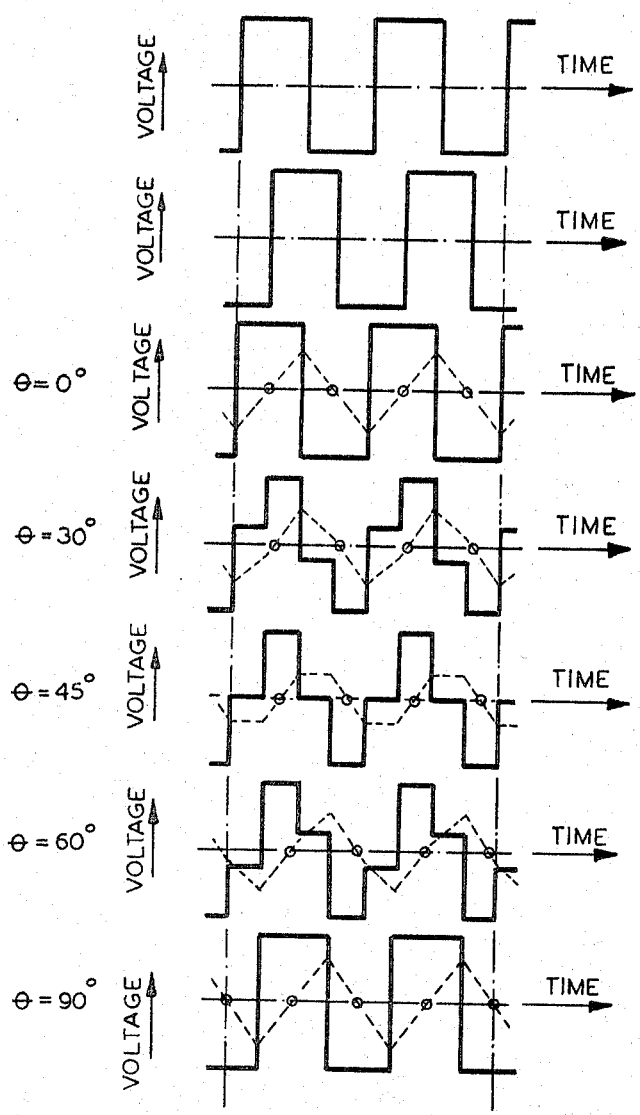
FIGS. 2A through 2G are explanatory waveforms illustrative of voltages developed at different later-described positions of adjustment of the potentiometer apparatus employed in the system of FIG. 1.

Considering the upper right-hand quadrant, for example, the substantially rectangular or square-wave voltage applied at I from the 0° output of flip-flop 2 is shown in FIG. 2A; and the corresponding quadrature voltage at IV, applied from the 0° output of flip-flop 3 is shown in FIG. 2B. The resultant voltages $V_o$ at the wiper 6' for successive positions of $\theta = 0°$ (i.e. at tap I), $\theta = 30°$, $\theta = 45°$, $\theta = 60°$ and $\theta = 90°$ (i.e. at tap IV), are shown in the respective wave-form diagrams of FIGS. 2C, 2D, 2E, 2F and 2G. After integration at 8, the corresponding integrated voltages $V_x$ will have the form of the dash-line waveforms illustrated in FIGS. 2C through 2G. The reference-axis crossing of the summed and integrated voltage $V_x$ is represented by small circles in FIGS. 2C through 2G, the voltage $V_x$ having a symmetrical average value about the reference axis with angle $\theta$, but the phase of $V_x$ for any value of angle $\theta$ being determined by the time at which $V_x$ crosses the reference-axis level; i.e. the locations of the small circles. If the positive going axis crossing is detected at 10, it will be observed that the position or locus of the small circles, or the phase of the selected cross-over point, slips or advances to the right in successive FIGS. 2C through 2G with respect to either of the periodic signals of FIGS. 2A or 2B. As the wiper arm 6' is moved clockwise or counter clockwise in the first quadrant, within the range of 0° to 90°, the selected cross-over point moves to the right or back to the left, the phase of such movement being a direct function of the angle $\theta$, and a linear change in the phase of $V_x$ taking place for a linear change of angle $\theta$. Thus a tracking is achieved whereby one can stroboscopically observe any phase of the motion as the frequency of the input increases or decreases.

Similar remarks apply for the other quadrants of the summing voltage-divider potentiometer network 6. If, moreover, the position of the wiper 6' is changed continuously, as by rotating at a rate ω by the motor, the phase of the output signal $V_x$ will differ from that of the input signals to the summing device by the value ω. Selection of lower or higher values of frequency of the output signal $V_x$ may be accomplished by reversing the phase of the input signals applied to an opposing pair of quadrant terminals of the potentiometer 6, as well as by changing the direction of rotation of the wiper 6'.

For the illustrative stroboscopic purposes before-discussed, the output voltage $V_x$ may be fed to a trigger generator 12 of any conventional type to flash stroboscopic equipment at $V_s$ each time the output voltage $V_x$ crosses the zero or other reference level; the phase of the flashing with respect to the input signal $V_i$ being a linear function of the angle θ and, for a constant value of ω, the frequency of flashing being that of the input periodic signal $V_i$ plus or minus the value of ω in the case where $V_1$ has two equally spaced reference-crossings during its period, as a sine wave, for example.

Figures 3, 3A:
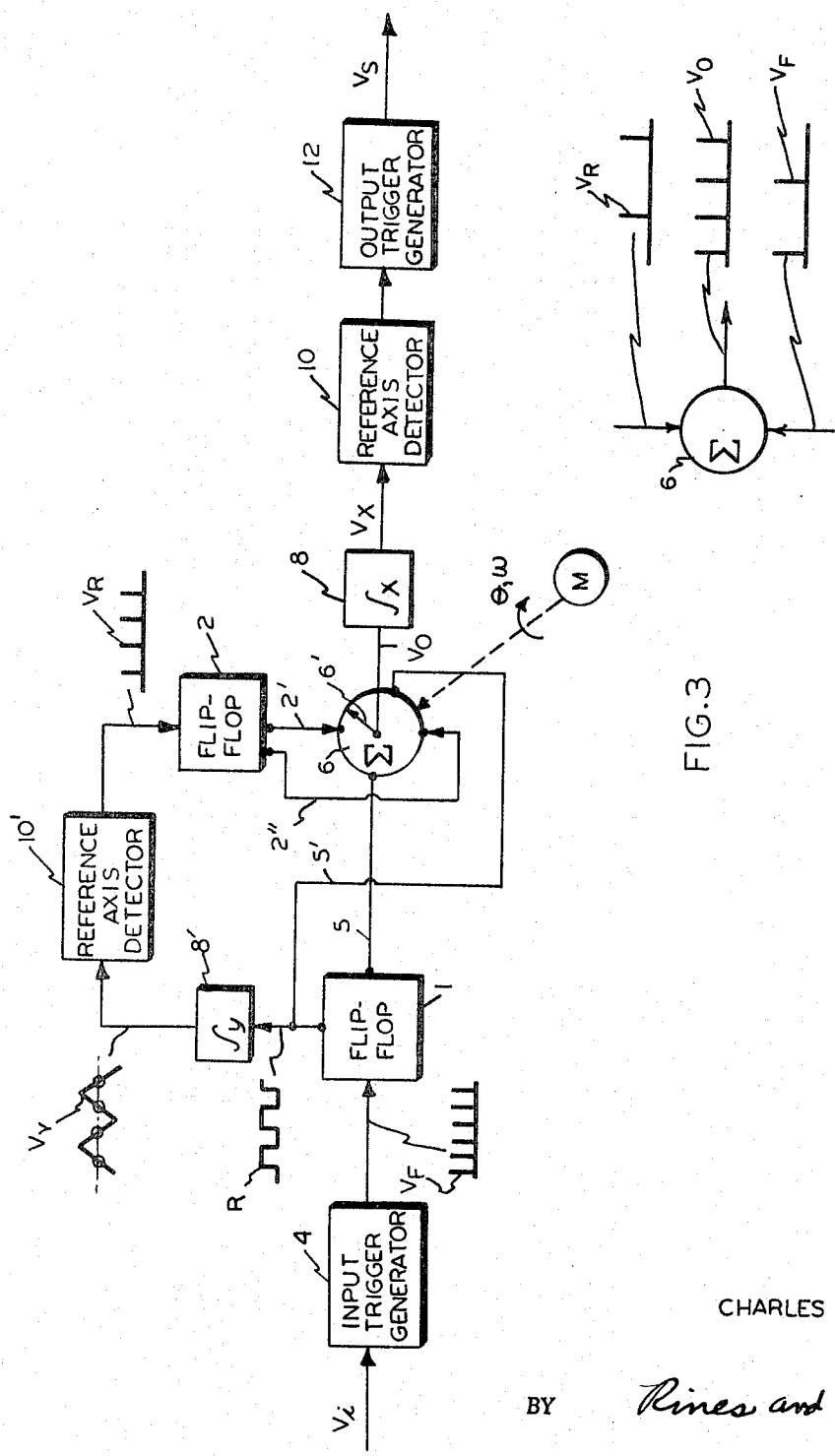
FIG. 3 is a diagram similar to FIG. 1 of a modification embodying the invention in alternative form.
FIG. 3A is a modification of FIG. 3 to provide a further new and improved frequency-changing apparatus.

An alternate system for frequency addition is shown in the modification of FIG. 3, wherein the reference numerals common with those of FIG. 1 represent the same components. Unlike the system of FIG. 1, however, the out-of-phase outputs of flip-flop stage 1 produced in response to input signals $V_f$, are shown directly applied at 5 and 5' to one pair of opposing terminals of the potentiometer summing network 6. In addition, the output at 5' is fed to an integration network 8' that converts the rectangular or substantially square-wave output R of the stage 1 to the triangular or, more generally, polygonic waveform $V_y$ having an average or reference level at which cross-over points occur, indicated again by small circles. It will be noted that these cross-over points occur precisely at the one-quarter and three-quarters points of the flip-flop waveform R such that, when detected at 10', as shown at $V_R$, they will trigger the flip-flop stage 2 at such times. The out-of-phase signals of the flip-flop 2 are applied at 2' and 2" to the other pair of opposite terminals of the summing potentiometer network 6 such that, as in the system of FIG. 1, a pair of quadrature sets of square waves are applied to the network 6 producing the same operation as described in connection with the embodiment of FIG. 1.

While particularly related to the purposes of the present invention, moreover, the system represented by elements 4, 1, 8', 10' and 6 is more broadly useful, as well, as an untuned or broadband frequency doubling circuit, the summed voltage $V_o$ containing the superposition of both sets of interlaced impulses $V_f$ and $V_R$, and thus twice the frequency of the input impulses $V_f$. More broadly, as shown in FIG. 3A, a frequency greater than that of the input impulses may be obtained from a summer 6.

In both the systems of FIGS. 1 and 3, moreover, the integration performed at 8 may, if desired, precede the summing device 6. Actual experimental apparatus was used to view motion at speeds of 5 to 120 cycles per second. Bistable multivibrators were employed at 2 and 3 with the motor driving the potentiometer wiper 6' at rates of from 0 to 3 cycles per second, and with the stroboscopic equipment utilizing a flash lamp of the FX6A type. If desired, of course, the wiper 6' may also be stationary and/or manually positioned as in operating slave stations where locking to a fixed point is desired. It should be observed that the circuits of the present invention permit the production of an output signal frequency that differs from the input frequency by a vanishingly small amount. Further modifications will also occur to those skilled in the art and all such are considered to fall within the spirit and scope of the invention as defined in the appended claims.

What is claimed is:

1. Apparatus of the character described having, in combination, means for producing input signal components of successive phase displacements, summing means having phase-displaced inputs respectively corresponding to and connected to receive the phase-displaced signal components, integrating means connected with the summing means, means responsive to the integrated and summed signals for detecting a reference-level signal-crossing time sequence therein, and means for producing output signals corresponding to the said time sequence.

2. Apparatus of the character described having, in combination, means for producing input signal components of successive quadrature phase displacements, summing means having quadrature phase-displaced inputs respectively corresponding to and connected to receive the quadrature phase-displaced signal components, integrating means connected with the summing means, means responsive to the integrated and summed signals for detecting a reference-level signal-crossing time sequence therein, and means for producing output signals corresponding to the said time sequence.

3. Apparatus of the character described having, in combination, means for producing input signal components of successive quadrature phase displacements, linear summing means having quadrature phase-displaced inputs respectively corresponding to and connected to receive the quadrature phase-displaced signal components, integrating means connected with the summing means, means responsive to the integrated and summed signals for detecting a reference-level signal-crossing time sequence therein, and means for producing output signals corresponding to the said time sequence.

4. Apparatus of the character described having, in combination, means for producing input signal components of successive quadrature phase displacements corresponding to periodic mechanical motions, linear summing means having quadrature phase-displaced inputs respectively corresponding to and connected to receive the quadrature phase-displaced signal components, integrating means connected with the summing means, means responsive to the integrated and summed signals for detecting a reference-level signal-crossing time sequence therein, and means for producing flashing stroboscopic output signals corresponding to the said time sequence.

5. Apparatus of the character described having, in combination, means for producing substantially square-wave input signal components of successive phase displacements, summing means having phase-displaced inputs respectively corresponding to and connected to receive the phase-displaced signal components, integrating means connected with the summing means, means responsive to the integrated and summed signals for detecting a reference-level signal-crossing time sequence in the resulting substantially polygonal waveforms, and means for producing output signals corresponding to the said time sequence.

6. Apparatus of the character described having, in combination, means for producing substantially square-wave input signal components of successive quadrature phase displacements, summing means having quadrature phase-displaced inputs respectively corresponding to and connected to receive the quadrature phase-displaced signal components, integrating means connected with the summing means, means responsive to the integrated and summed signals for detecting a reference-level signal-crossing time sequence in the resulting substantially polygonal waveforms, and means for producing output signals corresponding to the said time sequence.

7. Apparatus of the character described having, in combination, means for producing substantially square-wave input signal components of successive quadrature phase displacements, linear summing means having quadrature phase-displaced inputs respectively corresponding to and connected to receive the quadrature phase-displaced signal components, integrating means connected with the summing means, means responsive to the integrated and summed signals for detecting a reference-level signal-crossing time sequence in the resulting substantially polygonal waveforms, and means for producing output signals corresponding to the said time sequence.

8. Apparatus of the character described having, in combination, means for producing substantially square-wave input signal components of succesive quadrature phase displacements corresponding to periodic mechanical motions, linear summing means having quadrature phase-displaced inputs respectively corresponding to and connected to receive the quadrature phase-displaced signal components, integrating means connected with the summing means, means responsive to the integrated and summed signals for detecting a reference-level signal-crossing time sequence in the resulting substantially polygonal waveforms, and means for producing output signals for stroboscopic flashing corresponding to the said time sequence.

9. Apparatus of the character described having, in combination, means for producing input signal components of successive phase displacements, summing means having phase-displaced inputs respectively corresponding to and connected to receive the phase-displaced signal components and provided with means for varying the proportions of components summed, integrating means connected with the summing means, means responsive to the integrated and summed signals for detecting a reference-level signal-crossing time sequence therein, and means for producing output signals corresponding to the said time sequence.

10. Apparatus as claimed in claim 9 and in which the summing means comprises a potentiometer network and the varying means comprises a potentiometer wiper provided with means for adjusting the same.

11. Apparatus as claimed in claim 10 and in which the phase-displacements are substantially 90°.

12. Apparatus as claimed in claim 11 and in which the potentiometer network is substantially of circular configuration and the varying and adjusting means comprises means for rotating the said wiper.

13. Stroboscopic apparatus having, in combination, means for producing input signal components of successive phase displacements the input signal corresponding to periodic mechanical motions, summing means having phase-displaced inputs respectively corresponding to and connected to receive the phase-displaced signal components, integrating means connected with the summing means, means responsive to the integrated and summed signals for detecting a reference-level signal-crossing time sequence therein, and means for producing output signals for stroboscopic flashing corresponding to the said time sequence.

14. Apparatus as claimed in claim 13 and in which the summing means comprises a potentiometer network.

15. Apparatus as claimed in claim 14 and in which the potentiometer summing means is provided with a variable wiper for varying the proportion of the said components summed.

16. Apparatus as claimed in claim 15 and in which the phase-displacements are substantially 90° and the network is of substantially circular configuration.

17. Apparatus as claimed in claim 16 and in which means is provided for rotating the said wiper at a substantially constant rate.

18. Apparatus as claimed in claim 15 and in which the said signal-components are substantially square waves of substantially quadrature phase displacement.

19. Apparatus of the character described having, in combination, flip-flop means for producing substantially square-wave input signal components of successive phase displacements, summing means having phase-displaced inputs respectively corresponding to and connected to receive the phase-displaced signal components, integrating means connected with the summing means, means responsive to the integrated and summed signals for detecting a reference-level signal crossing time sequence therein, and means for producing output signals corresponding to the said time sequence.

20. Apparatus as claimed in claim 19 and in which the said flip-flop means comprises a first flip-flop the out-of-phase outputs of which are applied to second and third flip-flops the out-of-phase outputs of which, in turn, are applied to opposite pairs of inputs of the said summing means.

21. Apparatus as claimed in claim 20 and in which the summing means comprises a substantially linear electrically circular potentiometer the said opposite pairs of inputs of which define the quadrants thereof.

22. Apparatus as claimed in claim 21 and in which the potentiometer is provided with a movable wiper and means is provided for moving the same along the potentiometer at a substantially constant rate.

23. Apparatus as claimed in claim 21 and in which the said input signal corresponds to periodic mechanical motions and the said output signals stroboscopic flashes.

24. Apparatus as claimed in claim 19 and in which the said flip-flop means comprises a first flip-flop responsive to input impulses of predetermined frequency to produce out-of-phase outputs which are applied to a pair of opposite inputs of the summing means and one output of which is applied through further integrating means to further reference-level signal-crossing detecting means to produce further impulses occurring between the said input impulses, and further flip-flop responsive to the further detecting means and the out-of-phase outputs of which are applied to a further pair of opposite inputs of the said summing means.

25. Apparatus as claimed in claim 24 and in which the said input signal corresponds to periodic mechanical motions and the said output signals comprise stroboscopic flashes.

26. Apparatus of the character described having, in combination, a first flip-flop, means for applying input impulses of predetermined frequency to the flip-flop to produce out-of-phase outputs, summing means having two pairs of phase-displaced inputs, means for connecting the said flip-flop outputs to one pair of summing means inputs, integrating means, means for connecting one of the flip-flop outputs to the integrating means, reference-level signal-crossing detecting means connected with the integrating means to produce further impulses occurring between the said input impulses, and a further flip-flop responsive to the detecting means and the out-of-phase outputs of which are applied to the other pair of summing means inputs.

27. Apparatus as claimed in claim 26 and in which the said out-of-phase outputs are substantially square waves and the summing means comprises a substantially linear electrically circular potentiometer the said pairs of inputs of which define the quadrants thereof.

28. Apparatus as claimed in claim 26 and in which the detecting means produces one further impulse for each of the said input impulses in order that the said resultant output frequency is double the said predetermined input frequency.

29. A method of the character described, that comprises, producing input signal components of succesive phase displacements, summing the phase-displaced signal components, integrating the same, detecting the integrated and summed signals to locate a reference-level signal-crossing time sequence therein, and producing output signals corresponding to the said time sequence.

30. A method as claimed in claim 29 and in which the said phase-displacements are adjusted to be substantially in quadrature.

31. A method as claimed in claim 29 and in which the summing step comprises varying the proportions of signal components summed.

32. A method as claimed in claim 31 and in which the phase of the said output signal with respect to the said input signal components is continuously adjusted between substantially zero and 360 electrical degrees.

33. A method as claimed in claim 32 and in which the producing step comprises producing a flash in accordance with the said time sequence.

34. A method as claimed in claim 32 and in which the proportion-varying step is effected continually at a substantially constant rate.

35. A method as claimed in claim 34 and in which the frequency of the said output signal differs from the frequency of the said input signal components by a predetermined amount.

36. A method as claimed in claim 35 and in which the difference between the frequencies of the said output signal and the said input signal components may be made vanishingly small.

References Cited

UNITED STATES PATENTS

| 2,817,787 | 6/1953 | Kovasznay | 315—24 |
| 2,850,628 | 9/1958 | Davidoff | 328—55 |

FOREIGN PATENTS

| 632,007 | 11/1949 | Great Britain. |

ARTHUR GAUSS, *Primary Examiner.*

R. H. PLOTKIN, *Assistant Examiner.*